United States Patent
Seong

(10) Patent No.: US 9,847,515 B2
(45) Date of Patent: Dec. 19, 2017

(54) RECHARGEABLE BATTERY

(71) Applicant: Samsung SDI Co., Ltd., Yongin-si, Gyeonggi-do (KR)

(72) Inventor: Jae-Il Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 47 days.

(21) Appl. No.: 14/543,659

(22) Filed: Nov. 17, 2014

(65) Prior Publication Data

US 2015/0171380 A1 Jun. 18, 2015

(30) Foreign Application Priority Data

Dec. 12, 2013 (KR) .................. 10-2013-0154796

(51) Int. Cl.
| | |
|---|---|
| H01M 2/02 | (2006.01) |
| H01M 2/30 | (2006.01) |
| B32B 7/12 | (2006.01) |
| B32B 15/08 | (2006.01) |
| B32B 15/20 | (2006.01) |

(52) U.S. Cl.
CPC ............ *H01M 2/0202* (2013.01); *B32B 7/12* (2013.01); *B32B 15/08* (2013.01); *B32B 15/20* (2013.01); *H01M 2/024* (2013.01); *H01M 2/0267* (2013.01); *H01M 2/30* (2013.01); *B32B 2457/10* (2013.01); *H01M 2/0287* (2013.01); *H01M 2002/0205* (2013.01)

(58) Field of Classification Search
None
See application file for complete search history.

(56) References Cited

U.S. PATENT DOCUMENTS

| | | |
|---|---|---|
| 6,020,086 A | 2/2000 | Van Lerberghe |
| 7,103,415 B2 | 9/2006 | Probst et al. |
| 2003/0017390 A1 | 1/2003 | Probst et al. |
| 2008/0241654 A1 | 10/2008 | Koh et al. |
| 2010/0167116 A1 | 7/2010 | Okada |

(Continued)

FOREIGN PATENT DOCUMENTS

| | | |
|---|---|---|
| EP | 0 928 035 A1 | 7/1999 |
| EP | 1 498 964 A1 | 1/2005 |
| JP | 11-273709 | 10/1989 |

(Continued)

OTHER PUBLICATIONS

KIPO Office action dated Sep. 14, 2015, for corresponding Korean Patent application 10-2015-0100641, (8 pages).

(Continued)

*Primary Examiner* — Basia Ridley
*Assistant Examiner* — Haixia Zhang
(74) *Attorney, Agent, or Firm* — Lewis Roca Rothgerber Christie LLP

(57) ABSTRACT

A rechargeable battery includes: an electrode assembly; a case accommodating the electrode assembly; a cap plate sealing an opening of the case; and an electrode terminal at the cap plate and electrically coupled to the electrode assembly. The case includes: a first portion and a second portion opposite the first portion, at least one of the first and second portions being curved; and a reinforcing plate coupled to at least one of the first and second portions and having a curvature matching that of a corresponding curved one of the first and second portions.

20 Claims, 15 Drawing Sheets

(56) References Cited

U.S. PATENT DOCUMENTS

2011/0151284 A1    6/2011  Baek et al.
2013/0308282 A1   11/2013  Shin et al.

FOREIGN PATENT DOCUMENTS

| JP | 10-189056 A | 7/1998 |
|----|-------------|--------|
| JP | 2003-123706 | 4/2003 |
| JP | 2003-162985 A | 6/2003 |
| JP | 2005-203169 | 7/2005 |
| KR | 1999-022813 | 3/1999 |
| KR | 10-2008-0087959 | 10/2008 |
| KR | 10-2013-0119556 | 11/2013 |

OTHER PUBLICATIONS

English machine translation of Japanese Publication 2003-123706 dated Apr. 25, 2003, listed above, (13 pages).
EPO Search Report dated Apr. 14, 2015, for corresponding European Patent application 14196047.6, (8 pages).
KIPO Office action dated Oct. 31, 2014, for Korean priority Patent application 10-20130154796, (5 pages).
Patent Abstracts of Japan, and English machine translation of Japanese Publication 2005-203169 dated Jul. 28, 2005, listed above, (11 pages).
EPO Search Report dated Aug. 13, 2015, for corresponding European Patent application 14196047.6, (11 pages).
Patent Abstracts of Japan and Machine English Translation of JP 10-189056 A, Jul. 21, 1998, 5 Pages.
Machine English Translation of JP 2003-162985 A, Jun. 6, 2003, 40 Pages.
EPO Search Report dated May 3, 2016, for corresponding European Patent application 14196047.6, (4 pages).

RECHARGEABLE BATTERY

CROSS-REFERENCE TO RELATED APPLICATION

This application claims priority to and the benefit of Korean Patent Application No. 10-2013-0154796, filed in the Korean Intellectual Property Office on Dec. 12, 2013, the entire contents of which are incorporated herein by reference.

BACKGROUND

1. Field

The described technology relates generally to a rechargeable battery having a curved case.

2. Description of the Related Art

A rechargeable battery (i.e., a secondary battery) is a battery which is designed to be repeatedly charged and discharged, unlike a primary battery. A small-capacity rechargeable battery is used in small, portable electronic devices, such as a mobile phone, a notebook computer, and a camcorder, and a large-capacity rechargeable battery is used as a motor-driving power supply, such as in an electric bicycle, a scooter, an electric vehicle, or a fork lift.

The rechargeable battery includes an electrode assembly wound, for example, in a jelly roll form in which a positive electrode and a negative electrode are stacked, having a separator therebetween, a case having the electrode assembly and an electrolytic solution received therein, a cap plate encapsulating (e.g., sealing) an opening on one side of the case, and an electrode terminal mounted on a cap plate to be electrically coupled to (e.g., electrically connected to) the electrode assembly.

An electronic device may have a curved shape and, thus, a rechargeable battery having a curved shape may be suitable for such electron device. For example, the rechargeable battery may be formed in a state in which the case is curved toward one side. In this case, the case may have a concavely curved portion and a convexly curved portion in the state in which the case is curved.

When the rechargeable battery having the curved case is charged, the concavely curved portion of the case may not maintain the curved state and may expand. That is, an entire thickness of the rechargeable battery between the concavely curved portion and the convexly curved portion of the case may increase due to deformation (e.g., expansion) of the concavely curved portion.

The above information disclosed in this Background section is only for enhancement of understanding of the background of the described technology, and therefore it may contain information that does not form the prior art that is known to a person of ordinary skill in the art.

SUMMARY

The described technology has been made in an effort to provide a rechargeable battery that maintains a curved state and/or shape of a case by reducing or minimizing a deformation of the case in the curved state.

An example embodiment provides a rechargeable battery including: an electrode assembly; a case accommodating the electrode assembly; a cap plate sealing an opening of the case; and an electrode terminal at the cap plate and electrically coupled to the electrode assembly, wherein the case includes: a first portion and a second portion opposite the first portion, at least one of the first and second portions being curved; and a reinforcing plate coupled to at least one of the first and second portions and having a curvature matching that of a corresponding curved one of the first and second portions.

The first portion and the second portion may each extend in a first direction and a second direction, and edges may couple the first portion and the second portion, and the first portion and the second portion may each be curved in a third direction normal to the first direction and the second direction.

The reinforcing plate may have a width in the first direction and a height in the second direction, the width and the height of the reinforcing plate may correspond to that of at least one of the first and second portions.

The reinforcing plate may include metal, the case may include metal, and the reinforcing plate may be welded to the case.

The reinforcing plate may include a resin, the case may include metal, and the reinforcing plate may be coupled to the case by thermal fusion or hot melting.

The reinforcing plate may have a width in the first direction and a height in the second direction, the width and the height of the reinforcing plate may correspond to that of at least one of the first and second portions, and the reinforcing plate may include: plate portions that may have a width in the first direction and may extend in the second direction; and ribs that may be offset from the plate portions in the third direction, may have a width in the first direction, and may extend in the second direction, wherein the plate portions and the ribs may be coupled to each other and may alternate along the first direction.

The plate portions and the ribs may extend along an entirety of the reinforcing plate in the second direction.

The reinforcing plate may have a width in the first direction and a height in the second direction, the width and the height of the reinforcing plate may correspond to that of at least one the first and second portions, and the reinforcing plate may include: plate portions that may have a height in the second direction and may extend in the first direction; and ribs that may be offset from the plate portions in the third direction, may have a height in the second direction, and may extend in the first direction, wherein the plate portions and the ribs may be coupled to each other and may alternate along the second direction.

The plate portions and the ribs may extend along an entirety of the reinforcing plate in the first direction.

The reinforcing plate may have a width in the first direction and a height in the second direction, the width and the height of the reinforcing plate may correspond to that of at least one the first and second portions, and the reinforcing plate may include: a plate portion; and ribs that may be offset from the plate portion in the third direction and may extend along diagonal directions crossing the first direction and the second direction.

The ribs may terminate at sides of the reinforcing plate extending parallel to the first direction, and the ribs may cross each other at a center area of the reinforcing plate.

Each of the ribs may terminate at adjacent sides of the reinforcing plate and may cross at least two of a remaining plurality of ribs.

The reinforcing plate may have a width in the first direction and a height in the second direction, the width and the height of the reinforcing plate may correspond to that of at least one of the first and second portions, and the reinforcing plate may include: plate portions that may extend in a first diagonal direction crossing the first direction and the second direction; and ribs that may be offset from the plate portions in the third direction and may extend in the first diagonal direction, wherein the plate portions and the ribs may be coupled to each to other and may alternate along a second diagonal direction crossing the first diagonal direction.

The plate portions and the ribs may extend across an entirety of the reinforcing plate in the first diagonal direction.

The first portion and the second portion may each be curved along the first direction.

The first portion and the second portion may each be curved along the second direction.

The reinforcing plate may include clad metal.

The case may include aluminum; and the clad metal may include: an aluminum layer coupled to the case; and a reinforcing layer coupled to the aluminum layer.

The reinforcing plate may include a laminate or a double-sided adhesive tape.

The reinforcing plate may include a synthetic resin and may be coupled to the corresponding curved one of the first and second portions by hot melting injection.

As set forth above, according to one or more example embodiments, it is possible to reduce or minimize the deformation of the case due to the internal pressure of the rechargeable battery due to repeated charging and discharging by bonding the reinforcing plate to the first portion (e.g., the concavely curved portion) that is curved (e.g., curved toward the center of the electrode assembly in the case). Therefore, the rechargeable battery may firmly maintain the curved state and/or shape of the case (e.g., may not inflate or expand).

DETAILED DESCRIPTION

Figure 1:
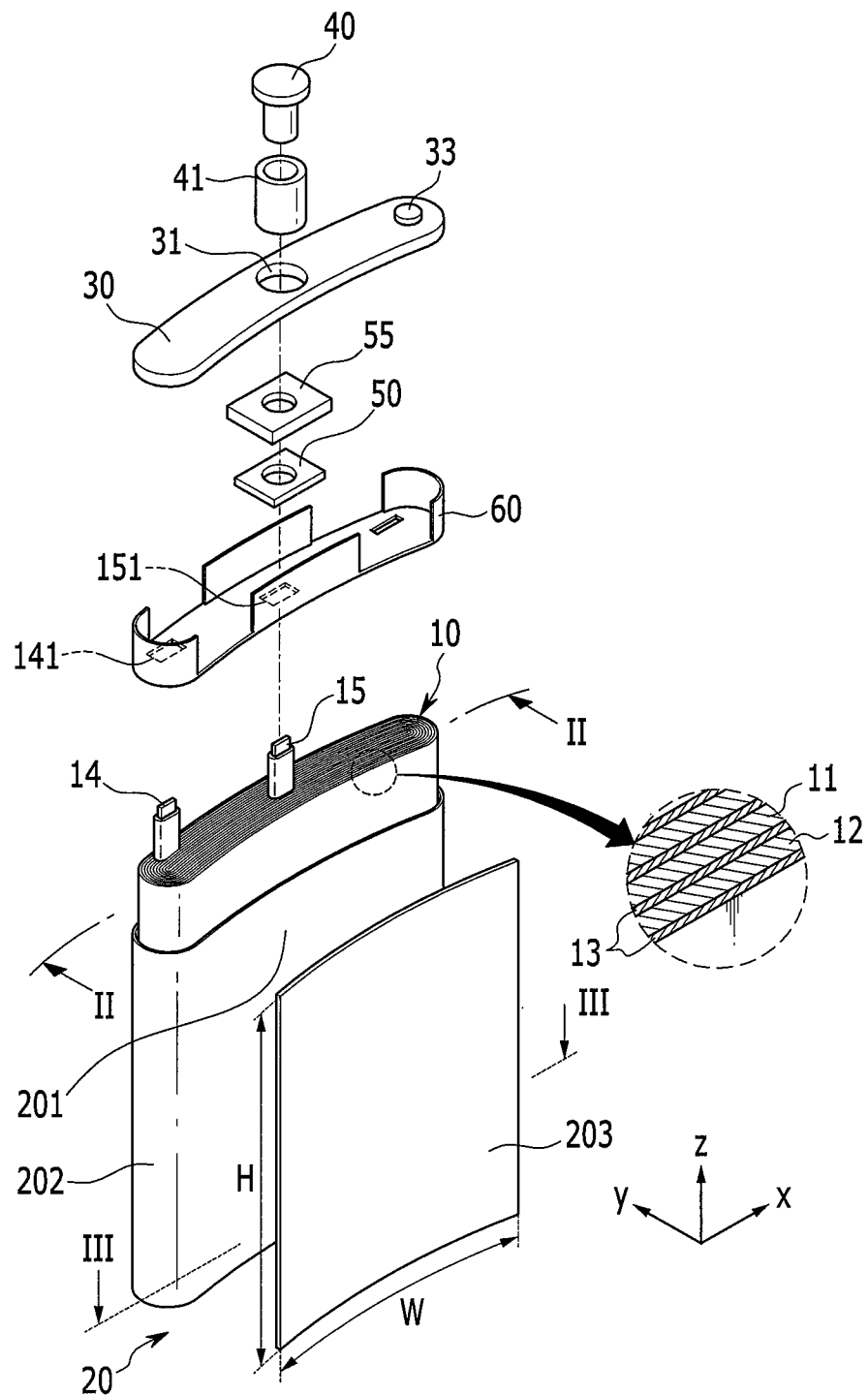
FIG. 1 is an exploded perspective view of a rechargeable battery according to a first example embodiment of the present invention.

The present invention will be described more fully hereinafter with reference to the accompanying drawings, in which example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. Further, the use of "may" when describing embodiments of the present invention relates to "one or more embodiments of the present invention."

Figure 2:
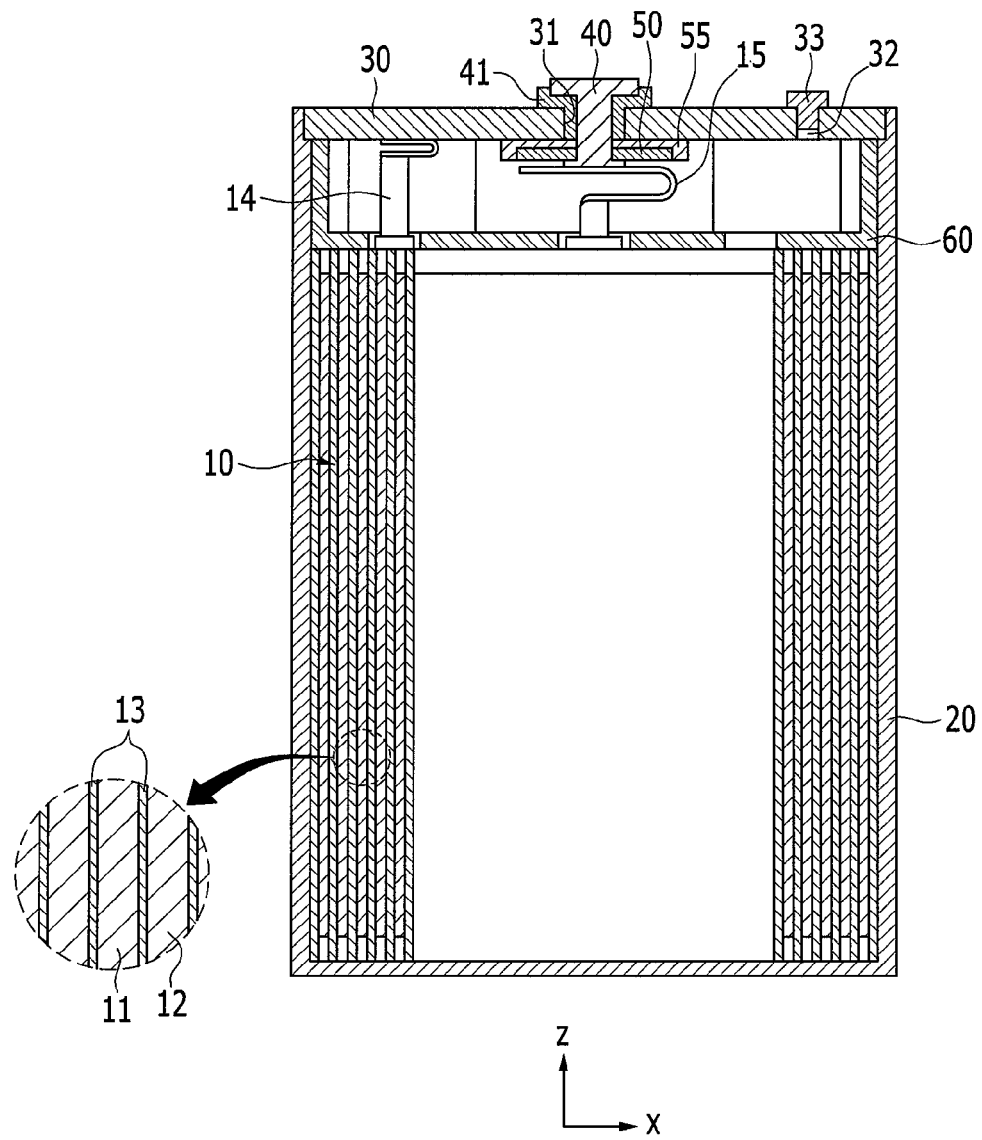
FIG. 2 is a cross-sectional view taken along the line II-II of FIG. 1.

FIG. 1 is an exploded perspective view of a rechargeable battery according to a first example embodiment of the present invention, and FIG. 2 is a cross-sectional view taken along the line II-II of FIG. 1.

Referring to FIGS. 1 and 2, the rechargeable battery according to the first example embodiment of the present invention includes an electrode assembly 10 which charges (or stores) and discharges a current, a case 20 which receives (e.g., accommodates) the electrode assembly 10 and an electrolytic solution, a cap plate 30 which encapsulates (e.g., seals) an opening at an upper end of the case 20, and an electrode terminal 40 which is mounted in a terminal opening 31 (e.g., terminal hole) of the cap plate 30 and is electrically coupled to (e.g., electrically connected to) the electrode assembly 10.

Further, the rechargeable battery according to the first example embodiment of the present invention further includes a terminal plate 50 which electrically couples the electrode terminal 40 to the electrode assembly 10 and an insulating case 60 (e.g., an insulating cover) which is between (e.g., mounted between) the cap plate 30 and the electrode assembly 10.

In the rechargeable battery, the electrode assembly 10, is inserted and assembled into a rectangular (e.g., square-shaped) case, and then, the rechargeable battery may be curved (e.g., entirely curved) by a warping act or process (e.g., by a bending or curving machine). For convenience, FIG. 1 illustrates the rechargeable battery according to an example embodiment of the present invention in which the case 20 is formed in a curved, rectangular (e.g., square) shape, and the electrode assembly 10 is formed to be curved in a state corresponding to the case 20 to insert the electrode assembly 10 into the case 20.

The electrode assembly 10 has a shape corresponding to an internal space of the curved, rectangular (e.g., square-shaped) case 20 so that the electrode assembly 10 is inserted into the case 20. For example, the case 20 includes curved portions 201 corresponding to wide, curved surfaces (e.g., x-z plane sides) of the electrode assembly 10 and side portions 202 which are formed at both sides of the curved portions 201 and correspond to sides (e.g., y-z plane sides) of the electrode assembly 10

The curved case 20 enables the insertion of the curved electrode assembly 10 and the curved insulating case 60 through the opening at the upper portion of the case 20, enables the coupling of the curved cap plate 30 with the opening, and is formed of a conductor (e.g., is formed of a conductive material) to receive (e.g., accommodate) the inserted electrode assembly 10 and serve as an electrode terminal. For example, the case 20 may be made of aluminum or an aluminum alloy.

The electrode assembly 10 is formed by stacking a positive electrode 11 and a negative electrode 12 with a separator 13, which is an electrical insulating material, disposed therebetween, and by being wound in, for example, a jelly roll form. The electrode assembly 10 includes a positive electrode lead tab 14 which is coupled (e.g., connected) to the positive electrode 11 and a negative electrode lead tab 15 which is coupled to the negative electrode 12.

The positive electrode lead tab 14 is coupled to a lower surface of the cap plate 30 by, for example, welding, and the case 20 is electrically coupled to the positive electrode 11 of the electrode assembly 10 through the cap plate 30 to serve or act as a positive electrode terminal.

The negative electrode lead tab 15 is coupled to a lower surface of the terminal plate 50 and coupled to one end of the electrode terminal 40 by, for example, welding. The electrode terminal 40, located at the terminal opening 31 of the cap plate 30, is electrically coupled to the negative electrode 12 of the electrode assembly 10 to serve or act as a negative electrode terminal.

However, the present invention is not limited thereto. For example, in other embodiments, the case may serve as the negative electrode terminal by coupling the negative electrode lead tab 15 to the cap plate 30, and the electrode terminal 40 may serve as the positive electrode terminal by coupling the positive electrode lead tab 14 to the electrode terminal 40.

The electrode terminal 40 is inserted into the terminal opening 31 of the cap plate 30 via an insulating gasket 41. That is, the insulating gasket 41 electrically insulates the terminal opening 31 from the electrode terminal 40 and forms a sealing structure between the terminal opening 31 and the electrode terminal 40.

The electrode terminal 40 extends through an insulating plate 55 to be coupled to the terminal plate 50, and the insulating plate 55 is between the terminal plate 50 and the electrode terminal 40. That is, the insulating plate 55 electrically insulates the cap plate 30 from the terminal plate 50 and further forms a sealing structure between the cap plate 30 and the terminal plate 50.

The cap plate 30 further includes an electrolytic solution injection opening 32. The electrolytic solution injection opening 32 enables the injection of an electrolytic solution into the case 20 after the case 20 is coupled with the cap plate 30. After the electrolytic solution is injected, the electrolytic solution injection opening 32 is encapsulated (e.g., sealed) with a closure stopper 33.

The insulating case 60 is curved to correspond to the curved case 20 so as to be between (e.g., mounted between) the electrode assembly 10 and the terminal plate 50 inside the case 20, thereby electrically insulating the electrode assembly 10 from the terminal plate 50. That is, the insulating case 60 electrically insulates the positive electrode 11 of the electrode assembly 10 from the negatively biased terminal plate 50.

Further, the insulating case 60 is provided with tab openings 141 and 151 (e.g., tab holes) through which the positive electrode lead tab 14 and the negative electrode lead tab 15 penetrate (e.g., pass through), respectively. Therefore, the positive electrode lead tab 14 may be coupled to the cap plate 30 by penetrating through the tab opening 141, and the negative electrode lead tab 15 may be coupled to the terminal plate 50 by penetrating through the tab opening 151.

Figure 3:
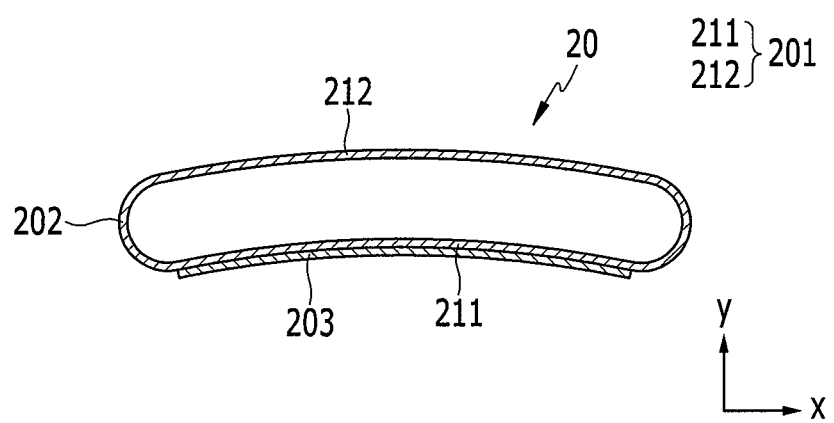
FIG. 3 is a transversal cross-sectional view of a case taken along the line III-III of FIG. 1.

FIG. 3 is a transversal cross-sectional view of the case taken along the line of FIG. 1. Referring to FIGS. 1 and 3, the case 20 includes the curved portions 201 in a curved state (e.g., having a curvature) and further includes a reinforcing plate 203 bonded to at least one of the curved portions 201.

The curved portions 201 of the case 20 include a first curved portion 211 (e.g., a first portion) (hereinafter, referred to as "concavely curved portion") which is curved toward a center of the electrode assembly 10 and a second curved portion 212 (e.g., a second portion) (hereinafter, referred to as "convexly curved portion") which is curved away the center of the electrode assembly 10 (e.g., the first curved portion 211 has a concave surface facing away from the electrode assembly 10, and the second curved portion 212 is opposite to the first curved portion 211 has a convexly curved portion facing away from the electrode assembly 10).

That is, when viewed normal to a curvature radius direction of the curved case 20, the concavely curved portion 211 forms an inside portion and the convexly curved portion 212 forms an outside portion of a curvature radius. Further, the concavely curved portion 211 and the convexly curved portion 212 are disposed in parallel with each other (e.g., are opposite to each other) and are coupled to the side portions 202 (e.g., edges).

The reinforcing plate 203 is bonded to the concavely curved portion 211 to reinforce or increase strength of the concavely curved portion 211 to suppress or reduce deformation of the concavely curved portion 211 due to an increase in an internal pressure of the rechargeable battery which occurs due to repeated charging and discharging, For example, the case 20 is stereoscopically formed (that is, is formed in three-dimensions) in a first direction (e.g., an x-axis direction or a width direction of the case), a second direction (e.g., a z-axis direction or a height direction of the case), and a third direction (e.g., a y-axis direction or a thickness direction of the case) which cross (e.g., intersect) one another. The case 20 is formed to extend in an x-z plane established in the x-axis direction and the z-axis direction and is curved with a curvature radius in the y-axis direction.

The reinforcing plate 203 is curved to correspond to the curvature radius of the concavely curved portion 211 (e.g., the reinforcing plate 203 has a curvature matching that of the concavely curved portion 211), has a width W in the x-axis direction and a height H in the z-axis direction to correspond to the concavely curved portion 211, and is bonded to the concavely curved portion 211.

For example, the reinforcing plate 203 is made of metal and may be bonded to the concavely curved portion 211 of the case 20 made of metal by, for example, welding. In one embodiment, the case 20 and the reinforcing plate 203 are made of the same material, for example, aluminum or an aluminum alloy, and may have a high bonding strength at the time of welding.

Further, the reinforcing plate 203 may be made of a resin and, in this embodiment, may be bonded to the case 20 made of metal by, for example, thermal fusion or hot melting. The reinforcing plate 203 made of the resin may further increase electric insulation at the concavely curved portion 211 of the case 20.

A force due to the internal pressure of the rechargeable battery is applied to the concavely curved portion 211, such that it has a tendency to stretch or expand, but the reinforcing plate 203 bonded to the concavely curved portion 211 may suppress the force to reduce or prevent the concavely curved portion 211 from stretching or expanding. Therefore, deformation of the concavely curved portion 211 of the case 20 due to inflation of the case 20 may be reduced or prevented.

Hereinafter, various example embodiments of the present invention will be described. In the description of the following example embodiments of the present invention, descriptions of aspects of the example embodiments of the present invention which have been previously described may be omitted and new and/or different configurations will be described.

Figure 4:
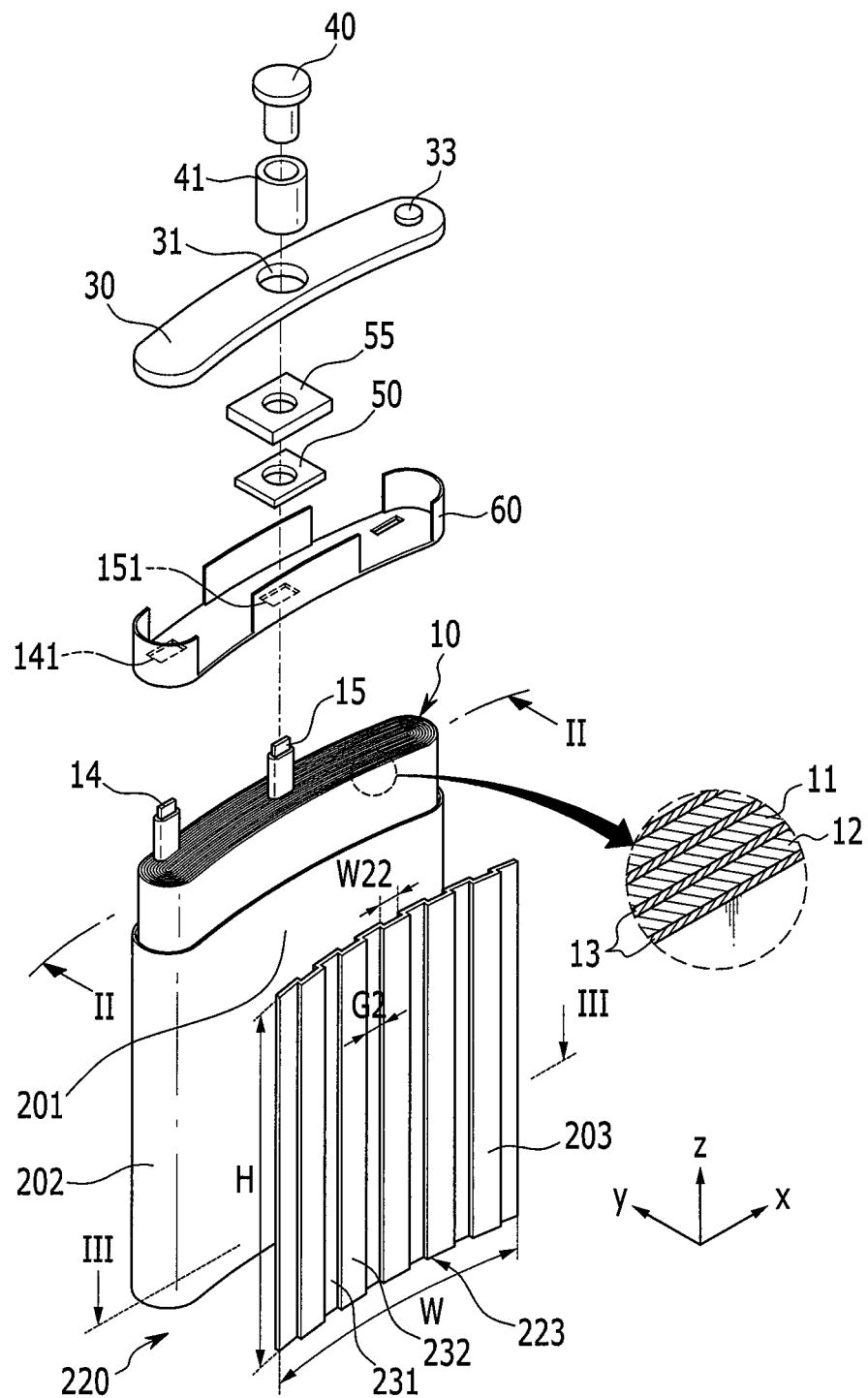
FIG. 4 is an exploded perspective view of a rechargeable battery according to a second example embodiment of the present invention.
Figure 5:
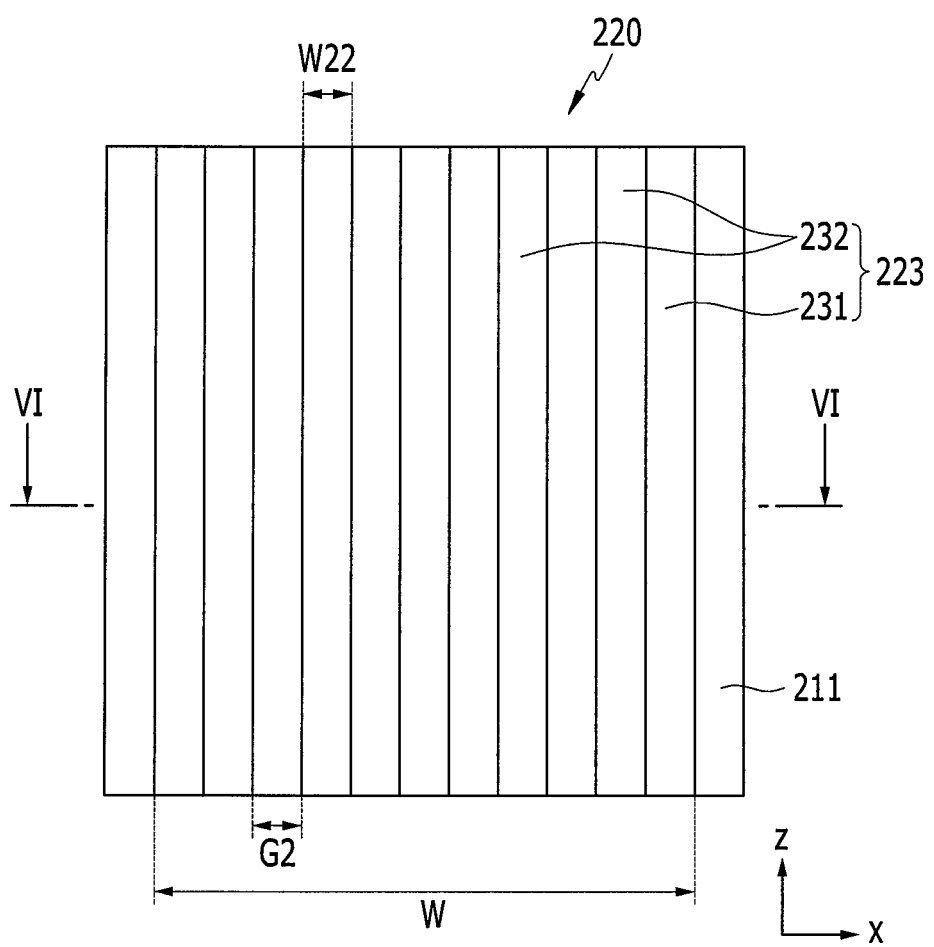
FIG. 5 is a front view of the case of the rechargeable battery shown in FIG. 4.
Figure 6:
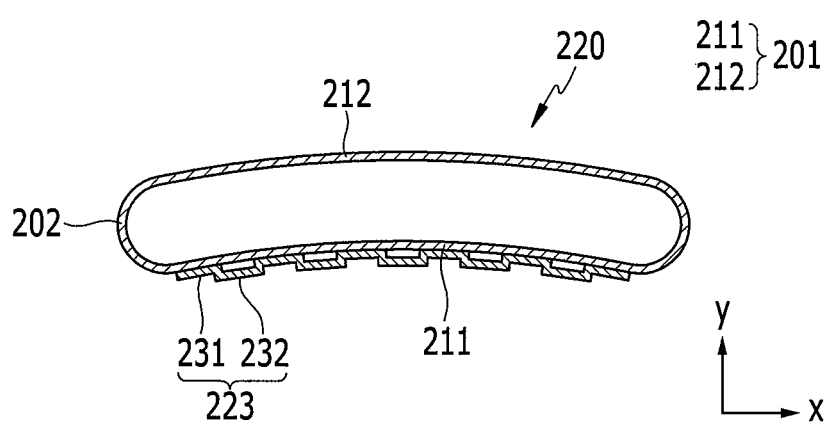
FIG. 6 is a transversal cross-sectional view of the case taken along the line VI-VI of FIG. 5.

FIG. 4 is an exploded perspective view of a rechargeable battery according to a second example embodiment of the present invention, FIG. 5 is a front view of the case of the rechargeable battery shown in FIG. 4, and FIG. 6 is a transversal cross-sectional view of the case taken along the line VI-VI of FIG. 5.

Referring to FIGS. 4 to 6, according to the second example embodiment of the present invention, a reinforcing plate 223 of a case 220 has a width W set in an x-axis direction and a height H set in a z-axis direction to correspond to a concavely curved portion 211 and includes plate portions 231 and ribs 232 which protrude in a y-axis direction while being spaced from (e.g., spaced apart from) each other along the x-axis direction and extend along a z-axis direction.

The reinforcing plate 223 is curved to correspond to the curvature radius of the concavely curved portion 211 and is bonded to the concavely curved portion 211 at the plate portions 231. Each rib 232 has a width W22 set in the x-axis direction and extends in the z-axis direction to increase the strength of the concavely curved portion 211.

Further, the ribs 232 may be spaced along the x-axis direction at an interval G2 (e.g., each plate portion may have a width G2). That is, the reinforcing plate 223 is bent, and the plate portions 231 and the ribs 232 may alternate along (e.g., may be alternately located along) the x-axis direction.

That is, each rib 232 extends in the z-axis direction, has the width W22, and is spaced apart at the interval G2 along the x-axis direction at the concavely curved portion 211, such that the reinforcing plate 223 is bent with the curvature in the y-axis direction and is bonded at the plate portions 231. Therefore, the reinforcing plate 223 has a strength which is further increased in the x-axis direction and in the z-axis direction due to the presence of the ribs 232.

A force is applied to the concavely curved portion 211 such that it tends to be stretched or expanded at the concavely curved portion 211 due to the internal pressure of the rechargeable battery, but the reinforcing plate 223 at the concavely curved portion 211 increases the strength of the case 220 and may suppress the force at the concavely curved portion 211. Therefore, the deformation of the concavely curved portion 211 of the case 220 due to inflation of the case 220 may be reduced or prevented.

Figure 7:
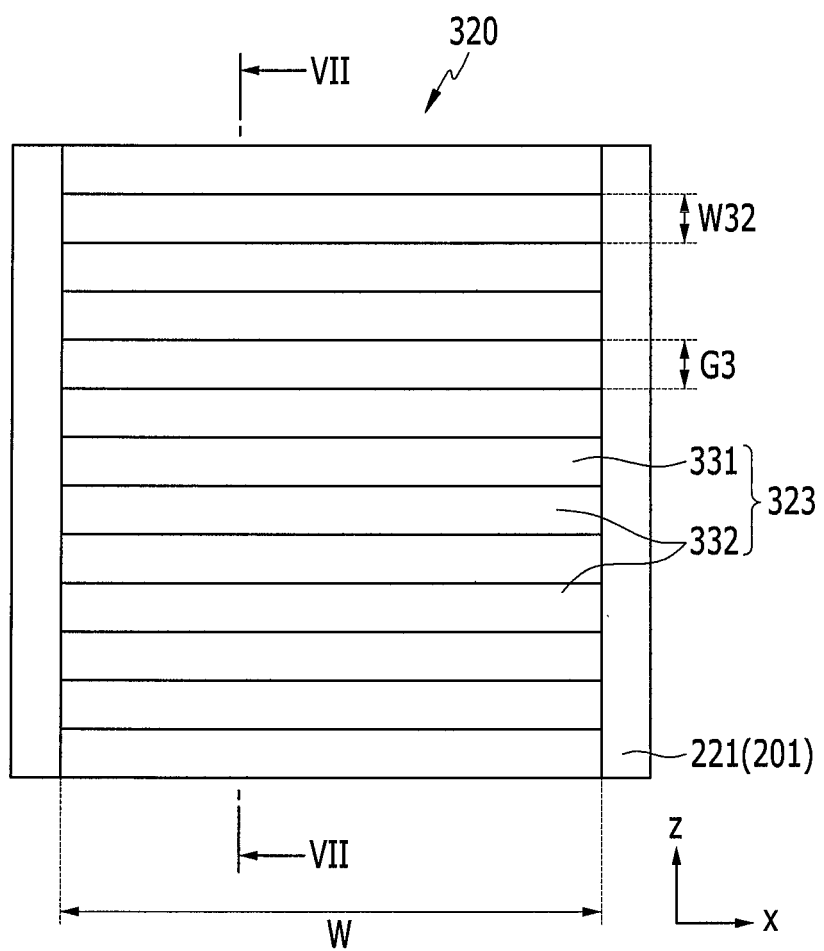
FIG. 7 is a front view of a case of a rechargeable battery according to a third example embodiment of the present invention.
Figure 8:
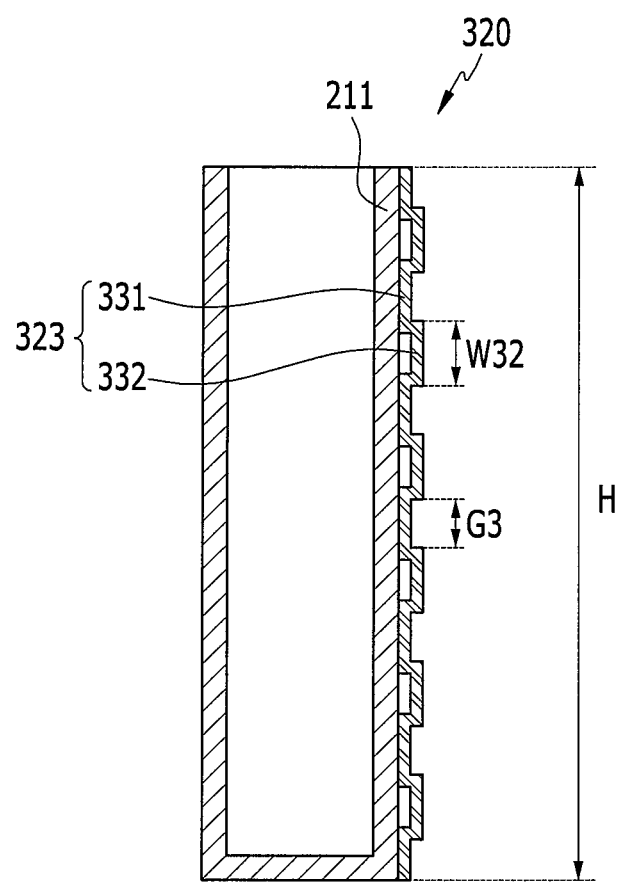
FIG. 8 is a cross-sectional view taken along the line VII-VII of FIG. 7.

FIG. 7 is a front view of a case of a rechargeable battery according to a third example embodiment of the present invention, and FIG. 8 is across-sectional view taken along the line VII-VII of FIG. 7.

Referring to FIGS. 7 and 8, according to a third example embodiment of the present invention, a reinforcing plate 323 of a case 320 has a width W set in an x-axis direction and a height H set in a z-axis direction to correspond to the concavely curved portion 211 and includes plate portions 331 and ribs 332 which protrude in a y-axis direction while being spaced from (e.g., spaced apart from) each other along the z-axis direction and extend in the x-axis direction.

The reinforcing plate 323 is curved to correspond to the curvature radius of the concavely curved portion 211 and is bonded to the concavely curved portion 211 at the plate portions 331. Each rib 332 has a width W32 set in the z-axis direction and extends in the x-axis direction to increase the strength of the concavely curved portion 211.

Further, the ribs 332 may be spaced along the z-axis direction at an interval G3 (e.g., each plate portion 331 may have a width G3). That is, the reinforcing plate 323 is bent, and the plate portions 331 and the ribs 332 may alternate along the z-axis direction.

That is, the ribs 332 extend in the x-axis direction, have the width W32, and are spaced apart at the interval G3 along the z-axis direction at the concavely curved portion 211, such that the reinforcing plate 323 is bent with a curvature in the y-axis direction and is bonded to the concavely curved portion 211 at the plate portions 331. Therefore, the reinforcing plate 323 has a strength which is further increased in the z-axis direction and in the x-axis direction due to the presence of the ribs 332.

A force is applied to the concavely curved portion 211 such that it tends to stretch or expand due to the internal pressure of the rechargeable battery, but the reinforcing plate 323 at the concavely curved portion 211 increases the strength of the concavely curved portion 211 and may suppress the force acting on the concavely curved portion 211. Therefore, deformation of the concavely curved portion 211 of the case 320 due to inflation of the rechargeable battery may be reduced or prevented.

Figure 9:
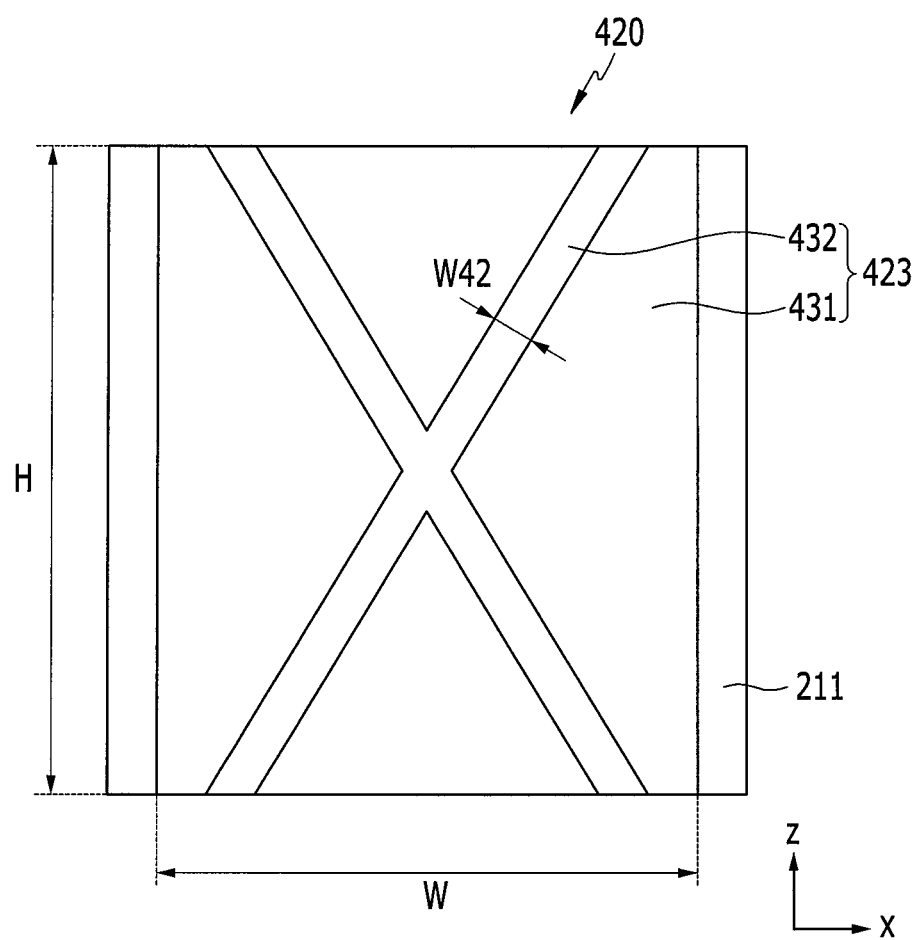
FIG. 9 is a front view of a case of a rechargeable battery according to a fourth example embodiment of the present invention.

FIG. 9 is a front view of a case of a rechargeable battery according to a fourth example embodiment of the present invention. Referring to FIG. 9, according to the fourth example embodiment of the present invention, a reinforcing plate 423 of a case 420 includes a plate portion 431 having a width W set in an x-axis direction and a height H set in a z-axis direction to correspond to the concavely curved portion 211 and ribs 432 which protrude in the y-axis direction and extend in directions crossing (e.g., intersecting) each other at one position of the reinforcing plate 423 (e.g., the ribs 432 cross each other at a center area of the reinforcing plate 423).

The reinforcing plate 423 is curved to correspond to the curvature radius of the concavely curved portion 211 and is bonded to the concavely curved portion 211 at the plate portion 431. The ribs 432 extend in directions crossing each other and have a width W42 set in a direction crossing (e.g., intersecting or normal to) the extending direction to increase the strength of the concavely curved portion 211.

A force is applied to the concavely curved portion 211 such that it tends to stretch or expand due to the internal pressure of the rechargeable battery, but the reinforcing plate 423 at the concavely curved portion 211 increases the strength thereof and may suppress the force at the concavely curved portion 211. Therefore, deformation of the concavely curved portion 211 of the case 420 due to inflation of the rechargeable battery may be reduced or prevented.

Figure 10:
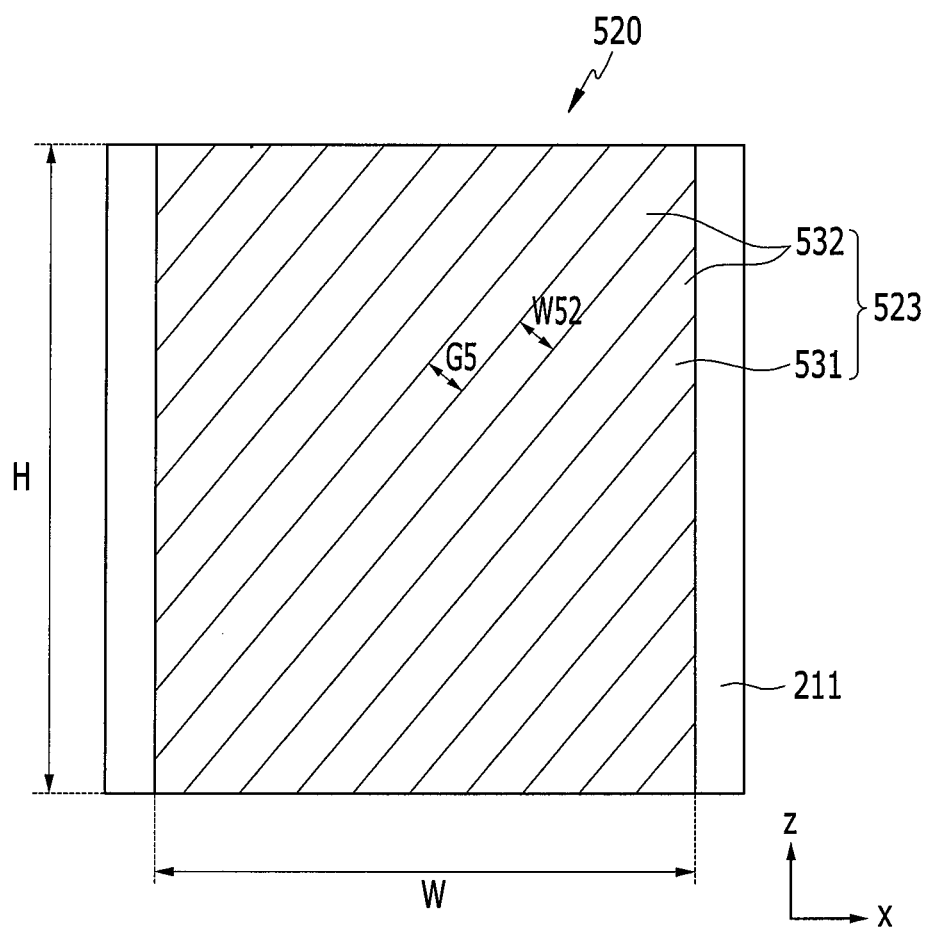
FIG. 10 is a front view of a case of a rechargeable battery according to a fifth example embodiment of the present invention.

FIG. 10 is a front view of a case of a rechargeable battery according to a fifth example embodiment of the present invention. Referring to FIG. 10, according to the fifth example embodiment of the present invention, a reinforcing plate 523 of a case 520 has a width W set in an x-axis direction and a height H set in a z-axis direction to correspond to the concavely curved portion 211 and includes plate portions 532 and ribs 532 which protrude in the y-axis direction and extend in a first diagonal direction crossing (e.g., intersecting or normal to) the x-axis direction and the z-axis direction (e.g., the ribs 532 extend at about a 45 degree angle with respect to the x-direction and the z-direction).

The reinforcing plate 523 is curved to correspond to the curvature radius of the concavely curved portion 211 and is bonded to the concavely curved portion 211 at the plate portions 531. The ribs 532 extend in the first diagonal direction crossing (e.g., intersecting or normal to) the x-axis direction and the z-axis direction and have a width W52 set on an x-z plane to increase the strength of the concavely curved portion 211.

Further, the ribs 532 may be spaced along a second diagonal direction crossing the first diagonal direction and spaced apart at an interval G5 (e.g., each of the plate portions 531 may have a width G5). That is, the reinforcing plate 523 is bent, and the plate portions 531 and the ribs 532 may alternate along the second diagonal direction crossing (e.g., opposite to) the first diagonal direction.

That is, the ribs 532 extend in the first diagonal direction, have the width W52, and are spaced apart at the interval G5 in the second direction crossing the first diagonal direction at the concavely curved portion 211, such that the reinforcing plate 523 is bent with the curvature in the y-axis direction and is bonded to the concavely curved portion 211 at the plate portions 531. Therefore, the reinforcing plate 523 has a strength which is further increased in the first diagonal direction and the second diagonal direction due to the presence of the ribs 532.

A force is applied to the concavely curved portion 211 such that it tends to stretch or expand at the concavely curved portion 211 due to the internal pressure of the rechargeable battery, but the reinforcing plate 523 at the concavely curved portion 211 may suppress the force acting on the concavely curved portion 211. Therefore, deformation of the concavely curved portion 211 of the case 520 due to inflation of the rechargeable battery may be reduced or prevented.

Figure 11:
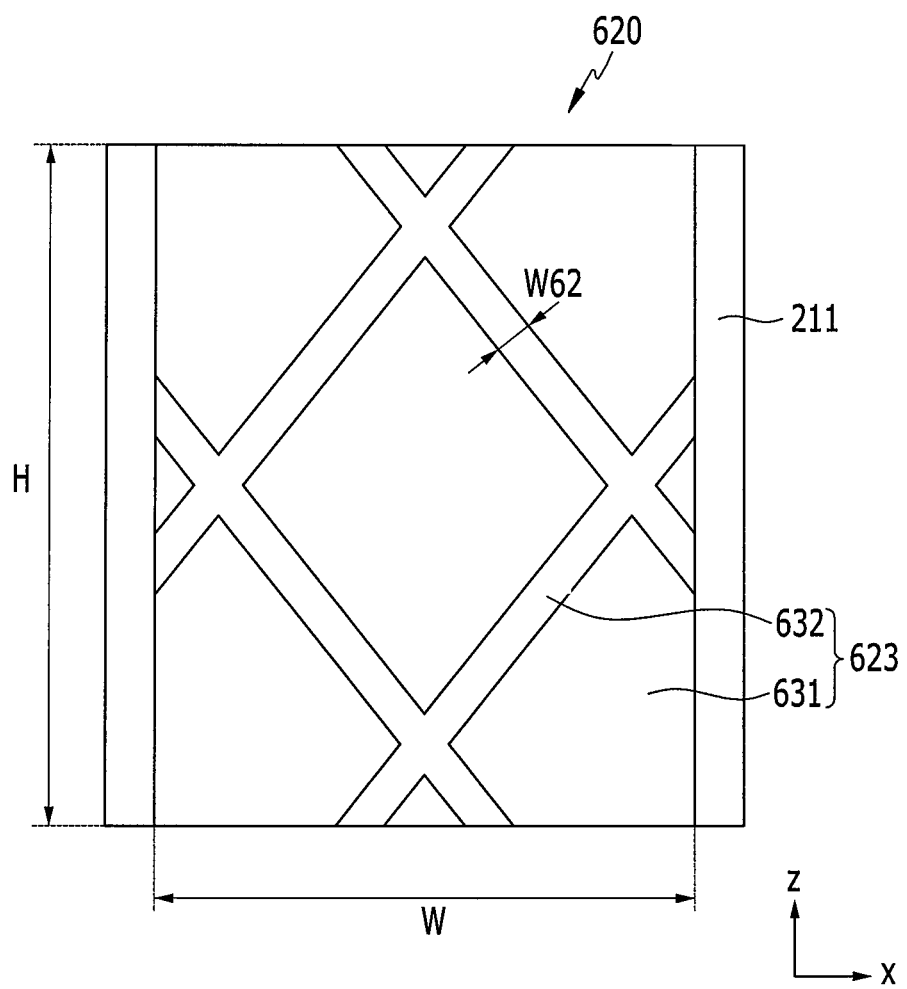
FIG. 11 is a front view of a case of a rechargeable battery according to a sixth example embodiment of the present invention.

FIG. 11 is a front view of a case of a rechargeable battery according to a sixth example embodiment of the present invention. Referring to FIG. 11, according to the sixth example embodiment of the present invention, a reinforcing plate 623 of a case 620 includes a plate portion 631 having the width W set in the x-axis direction and the height H set in the z-axis direction to correspond to the concavely curved portion 211 and ribs 632 which protrude in the y-axis direction, are disposed at four corners of the reinforcement plate 623, and extend in directions crossing (e.g., intersecting) two adjacent sides of the reinforcement plate 623 (e.g., the ribs 632 each terminate at two adjacent sides of the reinforcement plate 623).

The reinforcing plate 623 is curved to correspond to the curvature radius of the concavely curved portion 211 and is bonded to the concavely curved portion 211 at the plate portion 631. The ribs 632 extend in directions such that each rib 632 crosses (e.g., intersects) the two adjacent sides of the reinforcement plate 623, have a width W62, and extend in the y-axis direction (e.g., are curved along the y-axis direction), thereby increasing the strength of the concavely curved portion 211.

A force is applied to the concavely curved portion 211 such that it tends to stretch or expand at the concavely curved portion 211 due to the internal pressure of the rechargeable battery, but the reinforcing plate 623 at the concavely curved portion 211 may suppress the force acting on the concavely curved portion 211. Therefore, deformation of the concavely curved portion 211 of the case 620 due to inflation of the rechargeable battery may be reduced or prevented.

Hereinafter, methods of bonding the reinforcing plate to the concavely curved portion of the case will be further described. The reinforcing plates illustrated in the following example embodiments of the present invention may be the reinforcing plate illustrated in any of the first to sixth example embodiments of the present invention.

Figure 12:
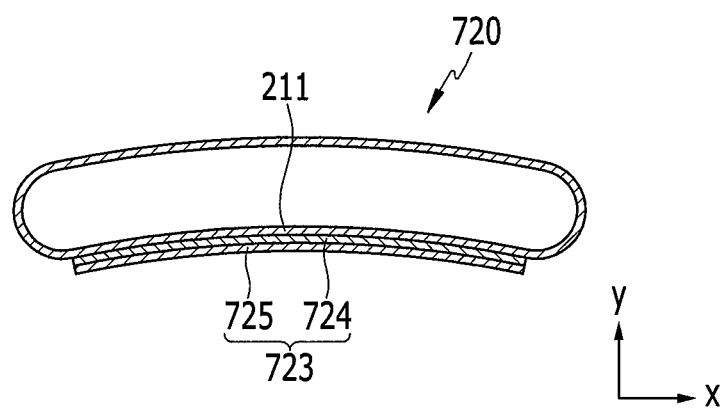
FIG. 12 is a transversal cross-sectional view of a case of a rechargeable battery according to a seventh example embodiment of the present invention.

FIG. 12 is a transversal cross-sectional view of a case of a rechargeable battery according to a seventh example embodiment of the present invention. Referring to FIG. 12, a reinforcing plate 723 of a case 720 according to the seventh example embodiment of the present invention may be made of clad metal.

That is, when the case 720 is made of aluminum, the reinforcing plate 723 may be made of the clad metal including an aluminum layer 724 and a reinforcing layer 725. That is, the clad metal is pressed on (e.g., compressed to) the concavely curved portion 211 of the case 720, such that the aluminum layer 724 is bonded to the concavely curved portion 211 in the state in which the reinforcing plate 723 includes the reinforcing layer 725.

The reinforcing plate 723, that is, the clad metal, includes the aluminum layer 724 which is the same material as the case 720 and, thus, may be firmly bonded to the concavely curved portion 211. The clad metal separately includes the reinforcing layer 725 to variously increase the strength of the concavely curved portion 211 depending on the material of the reinforcing layer 725.

Figure 13:
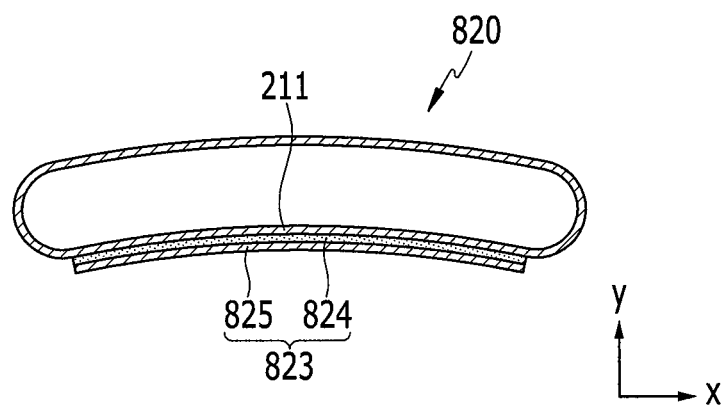
FIG. 13 is a transversal cross-sectional view of a case of a rechargeable battery according to an eighth example embodiment of the present invention.

FIG. 13 is a transversal cross-sectional view of a case of a rechargeable battery according to an eighth example embodiment of the present invention. Referring to FIG. 13, according to the eighth example embodiment of the present invention, a reinforcing plate 823 of a case 820 is formed as a laminate (e.g., as a laminate structure) including a plurality of metal layers and/or a double-sided adhesive tape and is bonded to the concavely curved portion 211 at the x-z plane.

That is, the reinforcing plate 823 includes an adhesive layer 824 and a reinforcing layer 825. The laminate and/or the double-sided adhesive tape easily bonds the reinforcing plate 823 to the concavely curved portion 211 of the case 820.

Figure 14:
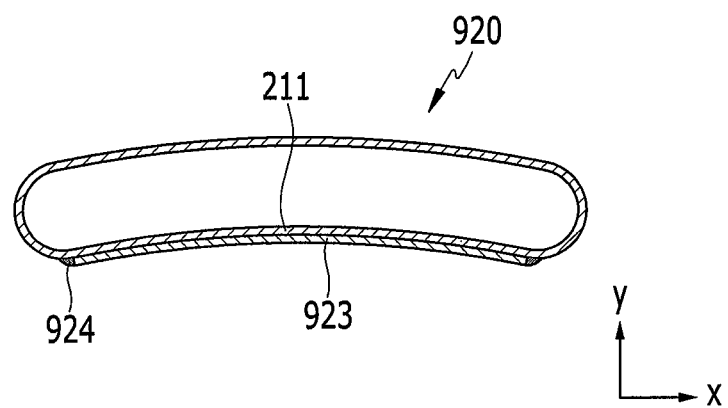
FIG. 14 is a transversal cross-sectional view of a case of a rechargeable battery according to a ninth example embodiment of the present invention.

FIG. 14 is a transversal cross-sectional view of a case of a rechargeable battery according to a ninth example embodiment of the present invention. Referring to FIG. 14, according to the ninth example embodiment of the present invention, a reinforcing plate 923 of a case 920 is made of a synthetic resin and is bonded to the concavely curved portion 211 at the x-z plane by hot melting injection. That is, when the case 920 and the reinforcing plate 923 are simultaneously or concurrently injected by the hot melting, the reinforcing plate 923 is bonded to the concavely curved portion 211 of the case 920 at least at both ends 924 of the reinforcing plate 923 in the x-axis direction.

Figure 15:
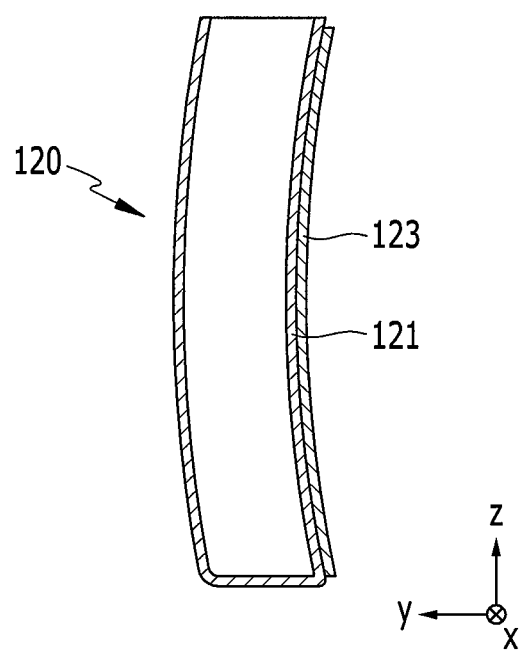
FIG. 15 is a longitudinal cross-sectional view of a case of a rechargeable battery according to a tenth example embodiment of the present invention.

FIG. 15 is a longitudinal cross-sectional view of a case of a rechargeable battery according to a tenth example embodiment of the present invention. Referring to FIG. 15, a case 120 according to the tenth example embodiment of the present invention is formed such that it is curved in the x-z plane with a curvature radius along the z-axis direction while forming a straight line in the x-axis direction. That is, the case 120 has a structure that is vertically curved in FIG. 15.

The cases 20, 220, 320, 420, 520, 620, 720, 820, and 920 according to the first to ninth example embodiments of the present invention are formed such that they are each curved in the x-z planes with the curvature radius along the x-axis direction while forming a straight line in the z-axis direction. That is, the cases 20, 220, 320, 420, 520, 620, 720, 820, and 920 have a structure that is horizontally curved in each drawing.

However, any of the cases 20, 220, 320, 420, 520, 620, 720, 820, 920, and 120 may be curved vertically and/or horizontally.

Further, according to the tenth example embodiment of the present invention, the reinforcing plate 123 is curved with a curvature radius along the z-axis direction and is bonded to the concavely curved portion 121. Further, any of the reinforcing members 203, 223, 323, 423, 523, 623, 723, 823, and 923 according to the first to ninth example embodiments of the present invention may be curved along the direction in which the case 120 according to the tenth example embodiment of the present invention is curved and, thus, may be applied to the concavely curved portion 121 of the case 120 as well.

While this invention has been described in connection with what is presently considered to be practical example embodiments, it is to be understood that the invention is not limited to the disclosed embodiments, but is intended to cover various modifications and equivalent arrangements included within the spirit and scope of the appended claims and their equivalents.

Description of Reference Symbols

| | |
|---|---|
| 10: Electrode assembly | 11: Positive electrode |
| 12: Negative electrode | 13: Separator |
| 14: Positive electrode lead tab | 15: Negative electrode lead tab |
| 20, 120, 220, 320, 420, 520, 620, 720, 820, 920: Case | |
| 30: Cap plate | 31: Terminal opening (terminal hole) |
| 32: Electrolytic solution injection opening | 33: Closure stopper |
| 40: Electrode terminal | 41: Insulating gasket |
| 50: Terminal plate | 55: Insulating plate |
| 60: Insulating case | 141, 151: Tab opening (tab hole) |
| 201: Curved portion | 202: Side portion |
| 123, 203, 223, 323, 423, 523, 623, 723, 823, 923: Reinforcing plate | |
| 121, 211: First curved portion (concavely curved portion) | |
| 212: Second curved portion (convexly curved portion) | |
| 231, 331, 431, 531, 631: Plate portion | |
| 232, 332, 432, 532, 632: Rib | |
| 724: Aluminum layer | 725, 825: Reinforcing layer |
| 824: Adhesive layer | 924: Both ends |
| G2, G3, G5: Interval | H: Height |
| W, W22, W32, W42, W52, W62: Width | |

What is claimed is:

1. A rechargeable battery comprising:
   an electrode assembly;
   a case accommodating the electrode assembly;
   a cap plate sealing an opening of the case; and
   an electrode terminal at the cap plate and electrically coupled to the electrode assembly,
   wherein the case comprises:
      a first portion and a second portion opposite the first portion, the first portion being concavely curved and the second portion being convexly curved; and
      a reinforcing plate external to a cavity of the case, coupled to the concavely curved first portion, and having a concave curvature matching that of the concavely curved first portion, and
   wherein the convexly curved second portion of the case is exposed without a reinforcing plate coupled thereto.

2. The rechargeable battery of claim 1, wherein the first portion and the second portion each extend in a first direction and a second direction, and edges couple the first portion and the second portion, and
   the first portion and the second portion are each curved in a third direction normal to the first direction and the second direction.

3. The rechargeable battery of claim 2, wherein the reinforcing plate has a width in the first direction and a height in the second direction, the width and the height of the reinforcing plate corresponding to that of at least one of the first and second portions.

4. The rechargeable battery of claim 3, wherein the reinforcing plate comprises metal, the case comprises metal, and the reinforcing plate is welded to the case.

5. The rechargeable battery of claim 3, wherein the reinforcing plate comprises a resin, the case comprises metal, and the reinforcing plate is coupled to the case by thermal fusion or hot melting.

6. The rechargeable battery of claim 2, wherein the reinforcing plate has a width in the first direction and a height in the second direction, the width and the height of the reinforcing plate corresponding to that of at least one of the first and second portions, and the reinforcing plate comprises:
   plate portions having a width in the first direction and extending in the second direction; and
   ribs offset from the plate portions in the third direction, having a width in the first direction, and extending in the second direction,
   wherein the plate portions and the ribs are coupled to each other and alternate along the first direction.

7. The rechargeable battery of claim 6, wherein the plate portions and the ribs extend along an entirety of the reinforcing plate in the second direction.

8. The rechargeable battery of claim 2, wherein the reinforcing plate has a width in the first direction and a height in the second direction, the width and the height of the reinforcing plate corresponding to that of the concavely curved first portion, and the reinforcing plate comprises:
   plate portions having a height in the second direction and extending in the first direction; and
   ribs offset from the plate portions in the third direction, having a height in the second direction, and extending in the first direction,
   wherein the plate portions and the ribs are coupled to each other and alternate along the second direction.

9. The rechargeable battery of claim 8, wherein the plate portions and the ribs extend along an entirety of the reinforcing plate in the first direction.

10. The rechargeable battery of claim 2, wherein the reinforcing plate has a width in the first direction and a height in the second direction, the width and the height of the reinforcing plate corresponding to that of the concavely curved first portion, and the reinforcing plate comprises:
   a plate portion; and
   ribs offset from the plate portion in the third direction and extending along diagonal directions crossing the first direction and the second direction.

11. The rechargeable battery of claim 10, wherein the ribs terminate at sides of the reinforcing plate extending parallel to the first direction, and the ribs cross each other at a center area of the reinforcing plate.

12. The rechargeable battery of claim 10, wherein each of the ribs terminates at adjacent sides of the reinforcing plate and crosses at least two of a remaining plurality of ribs.

13. The rechargeable battery of claim 2, wherein the reinforcing plate has a width in the first direction and a height in the second direction, the width and the height of the reinforcing plate corresponding to that of the concavely curved first portion, and the reinforcing plate comprises:

plate portions extending in a first diagonal direction crossing the first direction and the second direction; and ribs offset from the plate portions in the third direction and extending in the first diagonal direction, wherein the plate portions and the ribs are coupled to each to other and alternate along a second diagonal direction crossing the first diagonal direction.

14. The rechargeable battery of claim 13, wherein the plate portions and the ribs extend across an entirety of the reinforcing plate in the first diagonal direction.

15. The rechargeable battery of claim 2, wherein the first portion and the second portion are each curved along the first direction.

16. The rechargeable battery of claim 2, wherein the first portion and the second portion are each curved along the second direction.

17. The rechargeable battery of claim 1, wherein the reinforcing plate comprises clad metal.

18. The rechargeable battery of claim 17, wherein:
the case comprises aluminum; and
the clad metal comprises:
an aluminum layer coupled to the case; and
a reinforcing layer coupled to the aluminum layer.

19. The rechargeable battery of claim 1, wherein the reinforcing plate comprises a laminate or a double-sided adhesive tape.

20. The rechargeable battery of claim 1, wherein the reinforcing plate comprises a synthetic resin and is coupled to the concavely curved one of the first and second portions by hot melting injection.

* * * * *